3,101,343
PROCESS FOR PREPARATION OF CERTAIN
ARYLATED HYDROXYBENZOAZOLES
Charles A. Clark, Binghamton, N.Y., Norman J. Doorenbos, Glen Burnie, Md., and Lester Horwitz, Kansas City, Mo., assignors to General Aniline & Film Corporation, New York, N.Y., a corporation of Delaware
No Drawing. Filed Jan. 9, 1957, Ser. No. 633,198
2 Claims. (Cl. 260—304)

This invention relates to a novel process for the preparation of hydroxy substituted o-aminothiophenols, o-aminophenols, o-aminoselenophenols and o-phenylene diamines. It relates further to a novel method for the preparation of hydroxy substituted azoles and functional derivatives thereof which serve as useful intermediates in the synthesis of sensitizing dyes.

Only a few compounds falling into the above classes have been described in the literature. Among the examples are: 2-amino-3-hydroxyaniline (J. Org. Chem., vol. 16, page 438), 2-amino-4-hydroxyaniline (Ber., vol. 37, page 2279), 2-amino-3-hydroxyphenol (Ber., vol. 39, page 323), 2-amino-5-hydroxyphenol (Annalen, vol. 164, page 6), and 2-amino-5-methyl-6-hydroxyphenol (Ber., vol. 55, page 3917). These compounds were synthesized through the reduction of appropriate nitro-, nitroso- or diazo-substituted intermediates. These procedures are limited since the desired intermediate is usually very difficult to prepare and the reductions do not always proceed smoothly.

It is among the objects of this invention to provide a substantially quantitative, simple, efficient, convenient and economical means of preparing hydroxy substituted anilines which also carry in the position ortho to the amino group, a thiol, selenol, hydroxy or amino group.

Other objects will be apparent from the following description.

We have found that aminophenols which carry as an additional substituent in ortho position to the amino group a thiol, selenole, amino or hydroxy group, can be prepared by heating in a mixture containing potassium hydroxide and sodium hydroxide at a temperature ranging from 220° C. to 280° C., aromatic azoles in which an aromatic nucleus is fused onto the azole nucleus and carries an alkoxy or aryloxy substituent as exemplified by benzoxazoles, benzothiazoles, benzoselenazoles, benzimidazoles, naphthoxazoles, naphthothiazoles, naphthoselenazoles, or naphthimidazoles which carry an alkoxy or aryloxy (phenoxy) substituent attached to the benzene or naphthalene ring. The period of heating time varies depending on the sample size and the choice of starting material but ranges generally from 3 to 30 minutes.

In order to avoid oxidative destruction of the hydroxy aniline formed in the process and in order to improve the yields, we consider it as the preferred embodiment of our invention to include in the fusion mixture a sulfur containing reducing agent, e.g., elementary sulfur or an alkali metal sulfide, e.g., sodium sulfide, potassium sulfide or a mixture of alkali metal polysulfides as they are present in some commercial grades of potassium or sodium sulfide.

The azoles which serve as starting materials are characterized by the following formula:

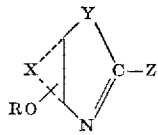

wherein R is a hydrocarbon radical of the alkyl or aryl series, e.g., methyl, ethyl, n-propyl, isopropyl, phenyl, tolyl, n-butyl, isobutyl, and the like, X represents the atoms necessary to complete an aromatic nucleus particularly of the benzene and naphthalene series, Y is an oxygen, sulfur or selenium atom or an imino group, and Z represents a substituent including hydrogen or halide atoms, e.g., a bromine or chlorine atom, an alkyl group, e.g., methyl, ethyl, n-propyl, isopropyl, hydroxymethyl, chloromethyl, and the like, an aryl group, e.g., phenyl, tolyl, xylyl and the like, an amino group or a substituted amino group, a mercapto group, a thioalkyl or a thioaryl group. Disulfides can be used in place of compounds containing the mercapto group.

As representatives of such azoles, the following are mentioned for purposes of illustration:

5-methoxy-2-methylbenzothiazole
6-methoxy-2-methylbenzothiazole
7-methoxy-2-methylbenzothiazole
6-ethoxy-2-methylbenzothiazole
6-methoxy-5-phenyl-2-methlybenzothiazole
5-methyl-6-ethoxy-2-methylbenzothiazole
6-methyl-5-ethoxy-2-methylbenzothiazole
5,6-dimethoxy-2-methylbenzothiazole
4,7-dimethoxy-2-methylbenzothiazole
5,6-diethoxy-2-methylbenzothiazole
5,6-methylenedioxy-2-methylbenzothiazole
5-methoxy-7-nitro-2-methylbenzothiazole
6-methoxy-4-nitro-2-methylbenzothiazole
6-methoxy-2-mercaptobenzothiazole
6-ethoxy-2-mercaptobenzothiazole
4-methoxy-6-chloro-2-mercaptobenzothiazole
6-methoxy-2-hydroxybenzothiazole
6-ethoxy-2-hydroxybenzothiazole
4-methoxy-2-aminobenzothiazole
6-methoxy-2-aminobenzothiazole
6-ethoxy-2-aminobenzothiazole
4-butoxy-2-aminobenzothiazole
6-isopropoxy-2-aminobenzothiazole
6-ethoxy-4-bromo-2-aminobenzothiazole
6,7-benzo-4-methoxy-2-aminobenzothiazole
4,5-benzo-6-methoxy-2-methylbenzothiazole
4,5,7-trichloro-6-methoxy-2-aminobenzothiazole
2-mercapto-5-methoxybenzoselenazole
2-amino-5-methoxybenzoselenazole
2-methyl-5-methoxybenzoselenazole
2-methyl-5-ethoxybenzoselenazole
2-methyl-6-methoxybenzoselenazole
2-methyl-5,6-diethoxybenzoselenazole
2-methyl-5-methoxybenzoxazole
2-methyl-6-methoxybenzoselenazole The reaction is carried out by adding the azole to the fused alkali hydroxide-alkali sulfide mixture. The amounts of sodium hydroxide and potassium hydroxide used in the fusion mixture are chosen in such a way that a fusion temperature between 220° C. and 280° C. can readily be maintained. The relative amounts required for a selected temperature can be ascertained from the data given on page 606 of Landolt Börnstein's "Physikalisch Chemische Tabellen," 5th edition (Springer, 1923, Berlin). Mixtures ranging from 20 to 60 mole percent of potassium hydroxide have been found satisfactory while mixtures of equal weight of sodium hydroxide and potassium hydroxide have been preferred for reasons of convenience because these amounts correspond essentially to those of the eutectic mixture.

The amounts of alkali sulfide employed may range from 2 percent to 20 percent of alkali sulfide (calculated as anhydrous) based on the total weight of the alkali hydroxide mixture.

The amount of azole added to the fusion mixture amounts to from 20 to 80 percent by weight based on the combined weight of potassium hydroxide and sodium hydroxide.

In all instances, the ratio is adjusted so as to get a liquid melt at the end of the fusion time. The azole is preferably added to the melted fusion mixture; if desired, the azole can be mixed with the alkali hydroxide, alkali sulfide mixture in the cold in which case the mixture is rapidly brought to the desired fusion temperature and maintained there for from 3–30 minutes or preferably for from 5–15 minutes.

It will be noted that our process combines into a single step the conversion of the azole structure into an ortho-substituted amine, and the hydrolysis of the alkyl or aryl ether group into a hydroxy group as a third substituent of the ring. Conventional methods would require at least two steps which would include the alkaline autoclave cleavage of the azole ring as described in U.S. Patent 2,007,335 and the breaking of the ether linkage by prolonged hydrolysis with hydrobromic acid as described in U.S. Patent 2,559,907.

After the fusion, the mixture is diluted with water. There results a solution or a suspension of the desired hydroxy substituted aniline. From this, many products can be formed which are particularly useful as intermediates in the the preparation of sensitizing dyes. The following shows the type of products which can be obtained by reaction with acid anhydrides, carbon disulfide or phosgene:

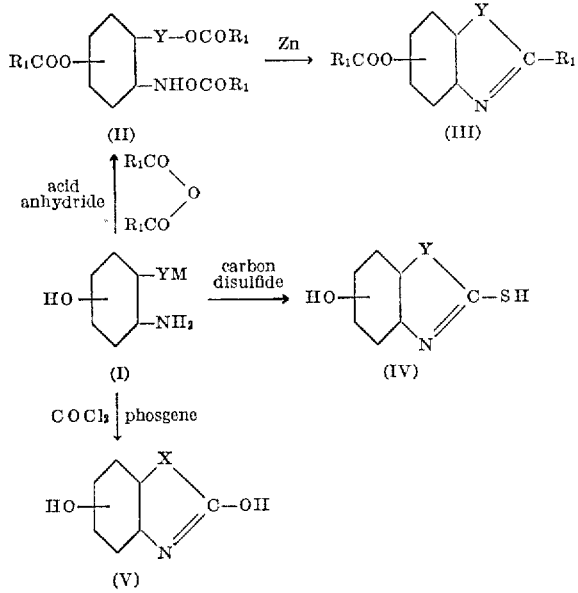

In these formulae, Y has the value given above, $R_1$ represents the residue of the anhydride and is alkyl or aryl, e.g., methyl, ethyl, propyl, phenyl, and the like and M is hydrogen or the alkali metal used in the fusion.

The azoles thus obtained have valuable properties and serve as important intermediates for the preparation of sensitizing dyes.

Other reagents with which the o-substituted hydroxy anilines can be reacted to give useful compounds or intermediates useful in the fields of chemotherapy, fungicides and bactericides, mineral dressings, and general chemical intermediates include the following:

Aldehydes
Thiophosgene
Ketones
Alkyl halides
Ethylene oxide
Compounds containing activated double bonds
Nitrous acid
Potassium cyanate
Phenylisothiocyanate
Hydrogen cyanide, cyanogen halides, and cyanamide
Picryl chloride
Hydrogen iodide
Oxidation
Alkaline pyrolysis In many instances, the hydroxy-substituted aniline need not be separate to form the above products. This time-saving step is particularly helpful in such instances when the hydroxy-substituted aniline is of an irritating nature.

In cases in which the separation of the hydroxy-substituted aniline may be desired, the isolation of the final product can be accomplished by conventional method.

The invention is further illustrated by the following examples, but it is to be understood that they are merely illustrative and not intended to limit the invention.

EXAMPLE I

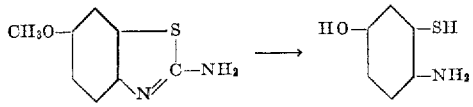

A mixture of 12 gms. of sodium hydroxide, 12 gms. of potassium hydroxide and 6 gms. of sodium sulfide (nona-hydrate) was placed in a copper beaker and heated to a temperature of 250°. To the fused alkali was added 10 gms. of 2-amino-6-methoxybenzothiazole. The mixture was stirred and maintained at 250–260° for seven minutes. Two hundred mls. of water was added and the solution filtered giving a solution of alkali salts of substantially pure 2-amino-5-hydroxythiophenol.

EXAMPLE II

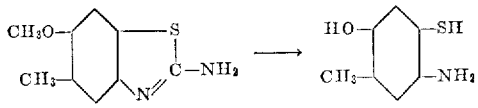

A mixture of 12 gms. of sodium hydroxide, 12 gms. of potassium hydroxide and 5 gms. of sodium sulfide (nona-hydrate) was placed in an iron crucible and heated to a temperature of 260° C. Ten grams of 2-amino-6-methoxybenzothiazole was added, the mixture was stirred and maintained at 260° C. for five minutes. Two hundred mls. of water was added to give an alkaline solution of 2-amino-4-methyl-5-hydroxythiophenol.

EXAMPLE III

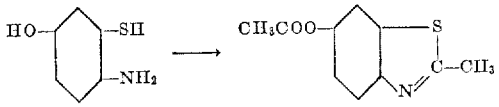

Into an alkaline solution 2-amino-5-hydroxythiophenol obtained according to Example I, was stirred 100 cc. of acetic anhydride. After stirring for 30 minutes, the oil was separated and the solution extracted with five 100 ml. portions of benzene. The oil and extracts were combined and the benzene distilled off. The residue was refluxed with 100 cc. of acetic anhydride for one hour and distilled. Six grams of a low melting solid was obtained which was substantially pure 2-methyl-6-acetoxybenzothiazole, M.P. 182° C.

EXAMPLE IV

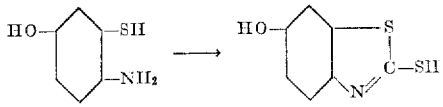

An alkaline solution 2-amino-5-hydroxythiophenol according to Example I, was stirred with 7.5 mls. of carbon disulfide for one hour while heating on a steam bath. The solution was cooled and acidified with hydrochloric acid. A precipitate formed which was filtered, washed carefully with water and dried. Eight and one-half grams of pure 2-mercapto-6-hydroxybenzothiazole was obtained.

EXAMPLE V

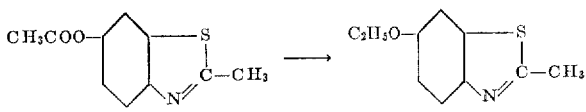

Ninety-five grams of sodium hydroxide was dissolved in 550 mls. of water and 63 gms. of 2-methyl-6-acetoxy-benzothiazole as obtained in Example III was added to this solution. The solution was stirred until all of the 2-methyl-6-acetoxybenzothiazole had hydrolyzed and dissolved as the sodium salt of 2-methyl-6-hydroxybenzothiazole. Then 95 gms. of ethyl sulfate was added to the stirred solution while keeping the temperature below 40°. The mixture was stirred for an hour after the addition of the methyl sulfate was completed. The mixture was extracted with three 100 ml. portions of benzene and the extract distilled. Forty grams of a low melting solid was obtained which was substantially pure 2-methyl-6-ethoxybenzothiazole.

EXAMPLE VI

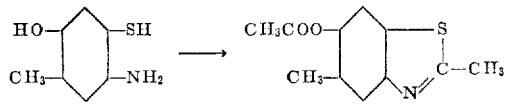

An alkaline solution of 2-amino-4-methyl-5-hydroxythiophenol obtained according to Example II was reacted with acetic anhydride in analogy with the procedure described in Example III. Six grams of 2,5-dimethyl-6-acetoxybenzothiazole was obtained, M.P. 85–86° C.

EXAMPLE VII

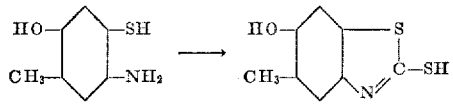

The alkaline solution of 2-amino-4-methyl-5-hydroxythiophenol obtained according to Example II, was converted into 9 gms. of 2-mercapto-5-methyl-6-hydroxybenzothiazole through a reaction with carbon disulfide as described in Example IV.

EXAMPLE VIII

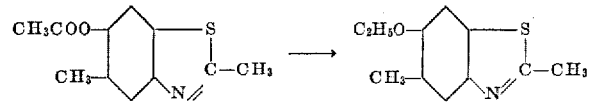

Fifty grams of 2,5-dimethyl - 6 - acetoxybenzothiazole was converted into twenty-nine grams of 2,5-dimethyl-6-ethoxybenzothiazole by the procedure described in Example V.

EXAMPLE IX

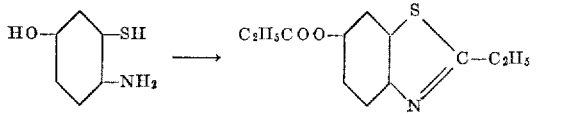

Into an alkaline solution of 2-amino-5-hydroxythiophenol obtained as described in Example I, was stirred 100 cc. of propionic anhydride. Stirring was continued for an additional 30 minutes. The oil which had separated was combined with the benzene extract of the solution, dried and the benzene distilled off. The residue was refluxed with 100 cc. of propionic anhydride for one hour. After distilling off the excess anhydride seven grams of substantially pure 2-ethyl-6-propoxybenzothiazole was obtained.

EXAMPLE X

*6-Acetoxy-2-Methylbenzothiazole Ethiodide*

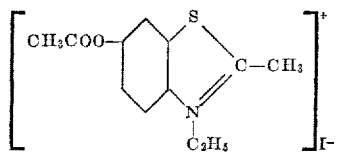

A mixture of 10 grams (0.05 mole) of 2-methyl-6-acetoxybenzothiazole prepared according to Example III and 20 grams (0.13 mole) of ethyl iodide was heated in a bomb at 132° for three hours. The reaction product was washed with ether and purified by dissolving it in ethanol (95%), treating the alcohol solution with charcoal, filtering off the charcoal, and precipitating the quaternary ammonium salt with water. Yield 15.2 grams; M.P. 241–244° C.

EXAMPLE XI

*6-Acetoxy-2,5-Dimethylbenzothiazole Ethiodide*

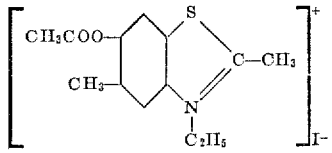

A mixture of 11.1 grams (0.05 mole) of 2,5-dimethyl-6-acetoxybenzothiazole and 15.6 grams (0.1 mole) of ethyl iodide was heated in a bomb on a steam bath for 24 hours. The reaction product was washed and purified as described in Example X. Yield 10.2 grams; M.P. 280–281° C.

EXAMPLE XII

*6-Acetoxy-2-Methylbenzothiazole Methiodide*

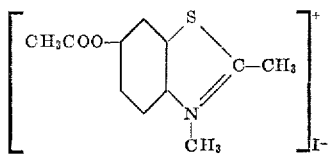

This compound was prepared in accordance with the procedure described in Example X except that methyl iodide was used in place of ethyl iodide. M.P. 237–239° C.

EXAMPLE XIII

*6-Acetoxy-2,5-Dimethylbenzothiazole Methiodide*

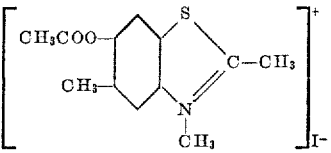

Example XI was repeated with the exception that methyl iodide was used in place of ethyl iodide. The methiodide obtained had a melting point of 306–308° C.

EXAMPLE XIV

*6-Acetoxy-3-Carboxymethyl-2,5-Dimethylbenzo thiazolium Bromide*

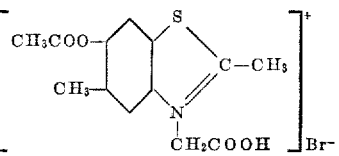

A mixture of 5.8 grams (0.025 mole) of 6-acetoxy-2,5-dimethylbenzothiazole, 3.5 grams (0.0025 mole) of bromo acetic acid and 5 cc. of nitrobenzene was heated in a bomb on a steam bath for 30 hours. The reaction product was washed with ether and recrystallized from methanol, M.P. 222–224° C.

EXAMPLE XV

*6-Acetoxy-3-Carboxymethyl-2-Methylbenzothiazolium Bromide*

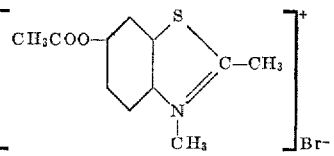

This compound was prepared according to the procedure described in Example XIV except that 5.5 grams of 6-acetoxy-2-methylbenzothiazole were used in place of 5.8 grams of 6-acetoxy-2,5-dimethylbenzothiazole. M.P. 215–217° C.

EXAMPLE XVI

*6-Acetoxy-3-Carboxyethyl-2-Methylbenzothiazolium Iodide*

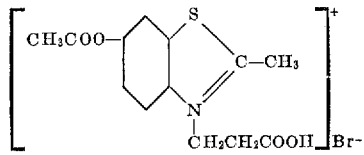

A mixture of 5.2 grams (0.025 mole) of 6-acetoxy-2-methylbenzothiazole, 5.0 grams (0.025 mole) of β-iodopropionic acid and 5 cc. of nitrobenzene was heated in a bomb on a steam bath for 24 hours. The resulting reaction product was washed with ether and recrystallized from a methanol-ether mixture.

EXAMPLE XVII

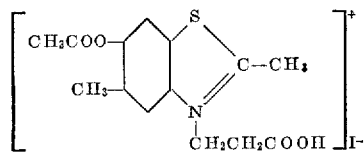

The above compound was prepared according to the procedure of Example XVI with the exception that 5.5 grams of 6-acetoxy-2,5-dimethylbenzothiazole were used in place of 5.2 grams of 6-acetoxy-2-methylbenzothiazole. The quaternary ammonium salt obtained melted at 243–246° C.

EXAMPLE XVIII

*6-Acetoxy-3-Benzyl-2-Methylbenzothiazolium Bromide*

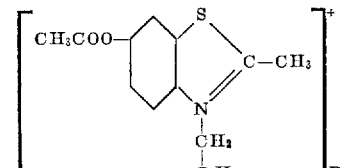

One molar equivalent of 6 - acetoxy - 2 - methylbenzothiazole and one molar equivalent of benzyl bromide dissolved in nitrobenzene were heated in a bomb on a steam bath for 24 hours. The recrystallized product melted at 158–160° C.

EXAMPLE XIX

*6-Acetoxy-3-Benzyl-2,5-Dimethylbenzothiazolium Bromide*

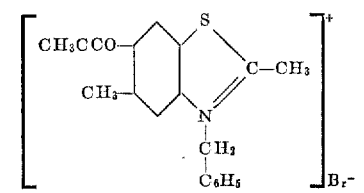

This compound was prepared by heating in a bomb one molar equivalent of 6-acetoxy-2,5-dimethylbenzothiazole and one molar equivalent of benzyl bromide in the presence of nitrobenzene for 24 hours on a steam bath.

EXAMPLE XX

*Preparation of 6-Hydroxy-2-Methylbenzothiazole*

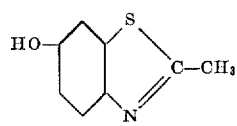

23.5 grams of freshly vacuum distilled 6-acetoxy-2-methylbenzothiazole were dissolved in 23.5 mils. of methanol and 100 mls. of water. The solution was heated on a steam bath for a total of 7 hours with stirring. During this time, 6 N aqueous sodium hydroxide solution was added slowly in such a manner that the solution was kept slightly alkaline to litmus paper at all times. The solution was filtered while hot and the filtrate acidified with glacial acetic acid. The solution was allowed to cool overnight. The product which had precipitated in quantitative yield was filtered off. For further purification, the compound was first recrystallized from methanol, then from ethanol, filtered off and washed with dry ether. The product was dried overnight at 50° C. The melting point of the analytically pure product was 182° C. sharp.

EXAMPLE XXI

*6-Hydroxy-2,5-Dimethylbenzothiazole*

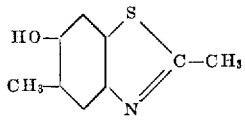

Example XX was repeated with the exception that 6-acetoxy-2,5-dimethylbenzothiazole was used as the starting material in place of 6-acetoxy-2-methylbenzothiazole. The resultant 6-hydroxy-2,5-dimethylbenzothiazole melted at 204° C.

The acyloxy substituted 2-alkylbenzothiazoles, particularly the 2-methylbenzothiazoles and their quaternary salts are important intermediates for the synthesis of valuable sensitizing dyes. They offer several unique advantages when compared with the 2-(β-acetanilinovinyl)-acyloxybenzothiazoles which have previously been described in the patent literature.

The 2-methyl derivatives can be used for the synthesis of monomethine dyes as well as all kinds of chain substituted trimethine and polymethine dyes, whereas the previously described β-acetanilinovinyl derivatives do not permit the synthesis of monomethines or chain substituted carbocyanines as illustrated by the following examples.

EXAMPLE XXII

*6-Acetoxy-2',3-Diethylthiapseudocyanine Iodide*

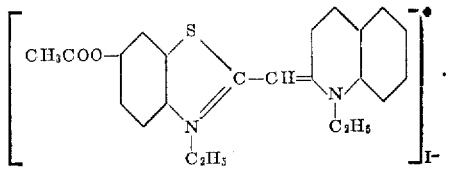

Two-tenths gram of 6-acetoxy-2-methylbenzothiazole ethiodide and 0.3 gram of 2-ethylmercaptoquinoline ethiodide were dissolved in 5 cc. of methanol. Three drops of triethylamine were added and the solution was heated on a steam bath for two minutes. The dye which precipitated after cooling was filtered, washed with ether and recrystallized from methanol. Yield 205 mgs.; M.P. 264.5° C.; abs. max. 484 mμ.

EXAMPLE XXIII

*6-Acetoxy-3,3',5-Trimethylthiacyanine Iodide*

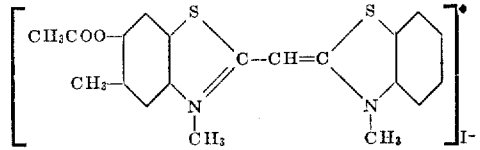

Two-tenths gram of 2-methylmercaptobenzothiazole methiodide and 0.2 gram of 6-acetoxy-2,5-dimethylbenzothiazole methiodide were dissolved in 5 cc. of methanol. Four drops of triethylamine were added and the mixture was heated on a steam bath for two minutes. After cooling, the dye was precipitated with ether, washed with ether, and recrystallized from methanol. Yield 125 mgs.; M.P. 275–276° C.; abs. max. 425 mμ.

EXAMPLE XXIV

*6-Acetoxy-3,3',9-Triethyl-6'-Methylthia-carbocyanine Iodide*

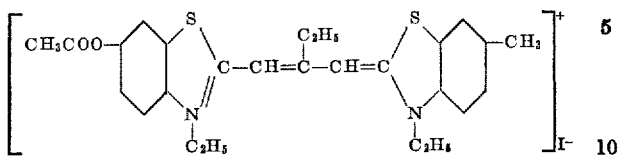

Two-tenths gram of 6-acetoxy-2-methylbenzothiazole ethiodide and 0.2 gram of 2-(β-methylmercapto-β-ethylvinyl)-6-methylbenzothiazole ethiodide were dissolved in 5 cc. of isopropanol. Three drops of triethylamine were added and the solution heated on a steam bath for two minutes. The solution was cooled, the dye precipitated by the addition of ether, dried and recrystallized from methanol. Yield 210 mgs.; M.P. 208–209° C.; abs. max. 549 mμ.

EXAMPLE XXV

*6-Acetoxy-3,3'9-Triethyl-5-Methyl-5'-Methoxy-thiaselenacarbocyanine Iodide*

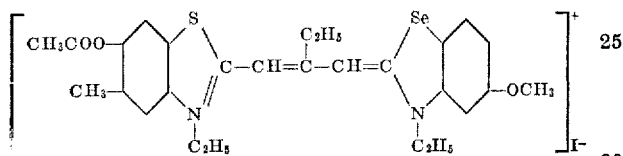

This dye was prepared from 0.2 gram of 6-acetoxy-2,5-dimethylbenzothiazole and 0.2 gram of 2-(β-methylmercapto-β-ethylvinyl)-5 - methoxybenzoselenazole ethiodide following the procedure described in Example XXIV. Yield 160 mgs.; M.P. 234–236° C.; abs. max. 560 mμ.

Various modifications of this invention will occur to persons skilled in the art and we, therefore, do not intend to be limited in the patent granted except as necessitated by the appended claims.

We claim:

1. A process of preparing an azole characterized by the following formula:

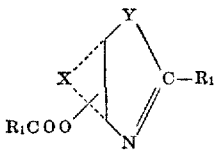

wherein X represents the atoms necessary to complete an aromatic ring system, Y represents a member of the group consisting of an oxygen atom, a sulfur atom, a selenium atom and an imino group, $R_1$ represents the residue of an acid anhydride, which comprises heating at a temperature ranging from 220° C. to 280° C., an azole characterized by the following formula:

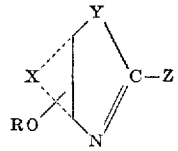

wherein X and Y have the values given above, Z is a substituent other than hydrogen and R is a member selected from the group consisting of alkyl and aryl group in a melt of mixture of sodium hydroxide and potassium hydroxide, said melt containing an alkali metal sulfide as a reducing agent and reacting the ortho-substituted aminophenol thus obtained with an acid anhydride.

2. A process of preparing 2-methyl-6-acetoxybenzothiazole which comprises heating 2-amino-6-methoxybenzothiazole in a melt of mixture of equal parts of potassium hydroxide and sodium hydroxide, said melt containing sodium sulfide as a reducing agent, dissolving the melt in water, reacting the solution of 2-amino-5-hydroxythiophenol thus obtained with acetic anhydride, separating the resulting diacetate and refluxing it with acetic anhydride.

References Cited in the file of this patent
UNITED STATES PATENTS

| | | |
|---|---|---|
| 2,515,913 | Van Zandt et al. | July 18, 1950 |
| 2,791,612 | Kinstler et al. | May 7, 1957 |

OTHER REFERENCES

Kiprianov et al.: Chem. Abstracts, volume 40, column 2307–8 (1946).

Kiprianov et al.: Chem. Abstracts, volume 43, column 9453 (1949).

Haginawa: Chem. Abstracts, volume 49, column 298–9 (1955).

Elderfield: "Heterocyclic Compounds," volume 5, pages 507, 510 (1957).

Leaper: J. Am. Chem. Soc., vol. 53, pp. 1891–1896 (1931).

UNITED STATES PATENT OFFICE
CERTIFICATE OF CORRECTION

Patent No. 3,101,343                      August 20, 1963

Charles A. Clark et al.

It is hereby certified that error appears in the above numbered patent requiring correction and that the said Letters Patent should read as orrected below.

Column 3, line 23, strike out "the", first occurrence; lines 45 to 50, the last structural formula should appear as shown below instead of as in the patent:

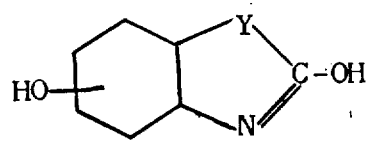

column 7, lines 54 to 61, the structural formula of EXAMPLE XIX should appear as shown below instead of as in the patent:

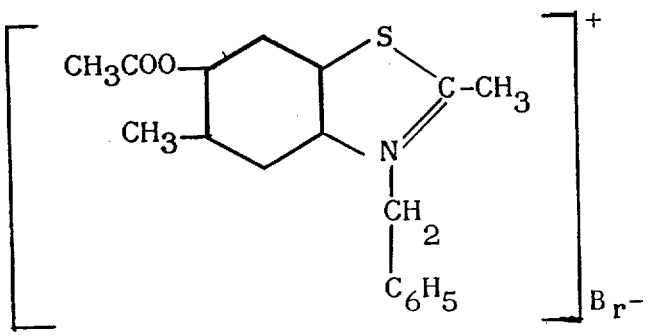

column 7, line 75, for "mils." read -- mls. --.

Signed and sealed this 7th day of July 1964.

(SEAL)
Attest:

ERNEST W. SWIDER                      EDWARD J. BRENNER

Attesting Officer                    Commissioner of Patents